Oct. 8, 1963  A. BOWMAN  3,106,687
AERIAL COUPLER FOR COAXIAL LEAD-IN
Filed Nov. 28, 1960  2 Sheets-Sheet 1
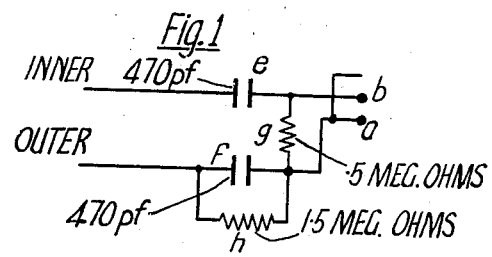
Inventor
Alfred Bowman
By
Attorneys Oct. 8, 1963 A. BOWMAN 3,106,687
AERIAL COUPLER FOR COAXIAL LEAD-IN
Filed Nov. 28, 1960 2 Sheets-Sheet 2
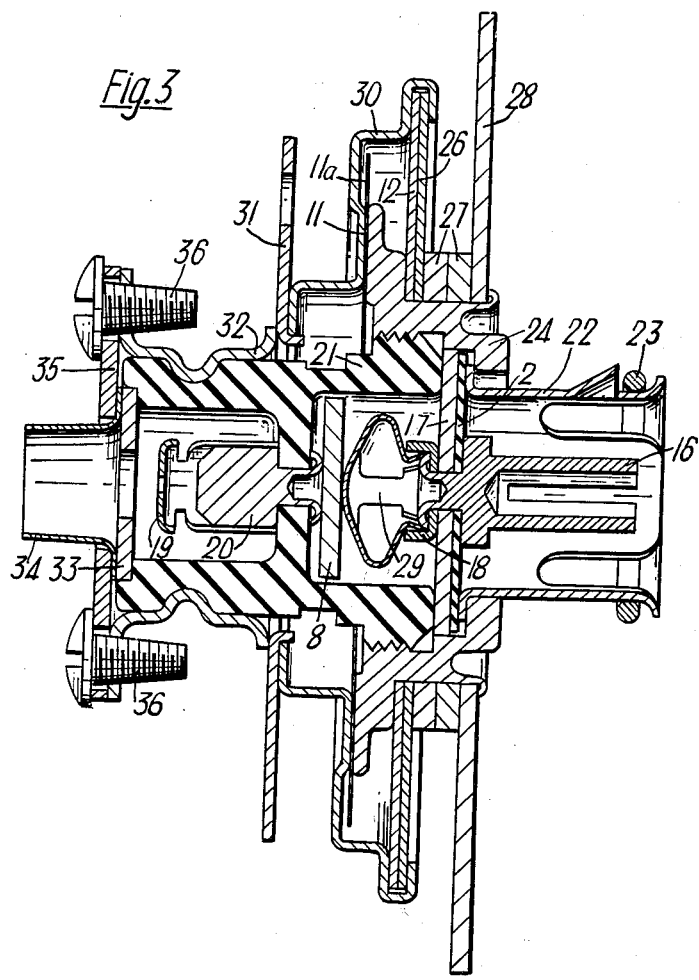
Inventor
Alfred Bowman
By
Attorneys United States Patent Office 3,106,687
Patented Oct. 8, 1963

3,106,687
AERIAL COUPLER FOR COAXIAL LEAD-IN
Alfred Bowman, Canvey Island, England, assignor to Egen Electric Limited, Canvey Island, England
Filed Nov. 28, 1960, Ser. No. 72,153
Claims priority, application Great Britain Dec. 16, 1959
12 Claims. (Cl. 333—24)

This invention relates to aerial coupling devices of the type which comprises an assembly of two capacitors with connections such that when the device is connected to an aerial lead of the coaxial type, at least one capacitor is serially connected with the cable screen and another with the central conductor of the cable. The capacitors are of such a value as to offer a low impedance path to incoming radio frequency signals. The capacitors must also offer a very high impedance to low frequencies in order to prevent current from the power source flowing into the aerial system. For this reason the coupling devices are often referred to as aerial isolators.

This type of coupling device should be protected against breakdown of the isolating capacitors which might occur due to the building up of a static charge on the aerial system and this may be effected by the provision of a suitably disposed resistor or resistors, arranged so as not to impair unduly the transfer of radio signals from the aerial to the receiver to which it is connected by the device or allow appreciable current to flow from the receiver to the aerial system under the influence of line voltages.

For practical reasons the aerial isolator should be small in size and be adapted for easy connection to the aerial lead. Moreover, as the coupling must introduce some loss, by reason of the fact that it represents a circuit irregularity between the parts to be coupled, it is desirable that such irregularity should extend over a distance as short as possible with respect to the wave length of the signal to be received. Otherwise standing waves with appreciable losses ensue.

It has been proposed, for example in our British patent specification No. 826,975, in an aerial coupling device to mount two capacitors coaxially, one inside the other. By such an expedient the length over which the introduced impedance irregularity extends can be reduced, but since the tubular capacitors themselves must be of quite appreciable length, such coupling device has not been found to be generally satisfactory, especially as the tubular capacitors introduce inductance, which is not always negligible.

According to the invention a coupling device for a concentric cable comprises two capacitors and at least one resistor, in which the capacitors are arranged with their main surfaces in a plane or planes normal to the longitudinal axis of the device.

In the preferred form a resistor of disc or plate form is mounted coaxially with the capacitors, the main surface of the disc or plate being disposed in a plane normal to the said axis.

The above and other features of the invention will be more readily understood by a persual of the following description having reference to the accompanying drawings in which FIGURE 1 is a circuit diagram of a conventional impedance network of an aerial coupling device and FIGURE 2 is a sectional side elevation of a coupling device according to the invention, whilst FIGURE 3 is a sectional side elevation of a modified form of coupling device according to the invention. FIGURES 2 and 3 may be of say 4:1 scale.

In the circuit of FIGURE 1 an aerial lead is adapted to be connected to terminals $a$ and $b$ whilst terminals $c$ and $d$ are adapted to be connected to a television receiver input. The central conductor of the lead is connected to terminal $b$ whilst its outer screen is connected to terminal $a$. The coupling device has two isolating capacitors $e$ and $f$ serially connected respectively between terminals $b$ and $d$ and terminals $a$ and $c$. As there is danger of these capacitors breaking down under any exceptional stress, e.g. a large static charge building up on the aerial, it is necessary to provide leakage paths represented by resistors $g$ and $h$. Resistor $g$ bridges the two leads whilst resistor $h$ shunts capacitor $f$. Typical values of the impedances are indicated on the drawing.

The impedances of FIGURE 1 are incorporated in the embodiment of FIGURE 2 which will now be described.

The device comprises certain sub-assemblies which are adapted to be screwed together in concentric disposition. The first sub-assembly comprises an input socket 1 of brass which has a longitudinally projecting sleeve passing through a disc resistor 2, an insulating washer 3 and a metal cup 4. The end of the projecting sleeve is turned over to lock the sub-assembly together. The resistor is conveniently formed of an insulating base on which is deposited a resistance material which may be similar to that widely used in the manufacture of the resistance track (carbon) of volume control potentiometers for radio receivers. This resistor is that represented by $g$ in FIGURE 1. A second sub-assembly comprises an output socket 5 of brass and an insulating bush 6, the two being fixed together by a flange turned over from the socket 5 as shown. A brass connector for the cable screen is shown at 7 and consists of a body part and an outer sleeve concentric with the socket 1. The body of the connector 7 is threaded so that it meshes with a threaded periphery of the insulating bush 6. The screw connection is made sufficiently tight to make a good electrical connection between the outer face of the resistor 2 and the face of the connector 7 which it engages. The bush 6 houses a capacitor 8 consisting of a ceramic disc with a silver coating on each side. Electrical connection between the socket 1 and the right hand plate of the capacitor 8 (i.e. $e$ of FIGURE 1) is effected through the cup 4 and a spring 9. The spring 9 has four resilient arms whose extremities are located in the cup 4. The output end of the device comprises the socket 5 and the sleeve of a brass connector 10 of which the body part is threaded and meshes with a peripheral screw thread on the bush 6. Opposing faces of the connector 10 and of the connector 7 constitute the plates of a capacitor 11 which is that represented by $f$ in FIGURE 1. This capacitor has a mica dielectric 11$a$ which extends beyond the plates, as shown, to prevent surface breakdown or "creep." The outer periphery of the connector 10 is screw threaded and the threaded portion extends so that its side 10$a$ is co-planar with a face 7$a$ on the connector 7. A resistor 12 abuts the surfaces 10$a$ and 7$a$. This resistor is of disc form similar to 2 and is represented by $h$ in FIGURE 1. A spacer 13$b$ and a cover 13$a$ are clamped to the resistor 12 by a nut 13 being screwed tightly on to the peripheral thread of the connector 7, ensuring a good electrical connection between the resistor 12 and the surface 7$a$. A brass outer ring 14 screwed on the peripheral thread of the connector 10 holds the face of the resistor 12 tightly against the surface 10$a$. A brass fixing nut 15 enables the device to be supported on a plate 16 which usually will be part of the chassis of the television receiver to which the aerial connection is being made. A collet 17 screws on the sleeve of the connector 10 and houses an insulating bush 18 and a dished washer 19. The end of the co-axial cable is prepared for connection in the usual way, the sleeved core passing into the socket 5 with which it makes good electrical contact. The collet is removed and the outer conductor or screen of the cable is passed between the collet and the washer. Reassembling the collet then completes the connection.

It will be seen that the capacitor 8 is serially connected between the socket 1 and the socket 5. Between socket 1 and connector 7 is electrically connected the resistor 2. Between the connector 7 and connector 10 is formed a capacitor 11. The capacitor is shunted by resistor 12 which is also serially connected between the connector 7 and the connector 10. Thus the conditions of FIGURE 1 are provided. A useful size for the device is where the scale of FIGURE 2 is 4:1.

Although in FIGURE 2 we have shown a socket at each end of the device to engage suitable plugs, it will be appreciated that one or both ends may instead have a plug to accommodate an appropriate socket member on the aerial lead or on the connection from the chassis.

In the modified form of FIGURE 3 the aerial coupling device is shown comprising three sub-assemblies with spun edges instead of the threaded sub-assemblies shown in FIGURE 2.

The first sub-assembly comprises an input socket 16 of brass which has an axial projection passing through a disc resistor 2, a backing washer 17 and a metal cup 18, the sub-assembly being locked together by turning over the tubular end of the axial projection. The resistor, represented by g in FIGURE 1, is similar to that shown in FIGURE 2 under the same reference. A second sub-assembly comprises a longitudinally split cup 19 of brass housing a brass contact pin 20 which has a protruding sleeve passing through an insulating bush 21, the two being clamped together by turning over the end of the sleeve. A spring 29, similar to spring 9 of FIGURE 2, and a ceramic capacitor 8 are positioned between the two sub-assemblies, electrical contact being made between the socket 16 and the right hand plate of the capacitor 8 through the cup 18 and contact spring 29. This capacitor 8 is that represented by e in FIGURE 1. A third sub-assembly comprises an isolator cap 24 of zinc alloy which has a longitudinal sleeve passing through a resistor 12 (of disc form similar to 2), backing washer 26, spacers, 27 and cover 28, the sub-assembly being clamped together by turning over the end of the sleeve as shown. The resistor 12 is represented by h in FIGURE 1. The input socket 22 for the screen lead, has a circlip 23 fitted at one end as shown and is clamped to the outer edge of resistor 2 by the insulating bush 21. This clamping is effected by the screw thread engagement of 21 into the isolator cap 24. Thus a direct electric connection exists between the socket 22, the capacitor 11, shunt resistor 12 and outer edge of resistor 2. Opposing faces of the isloator cap 24 and of an aluminium outer case 30 constitute the two plates of capacitor 11 represented by f in FIGURE 1. The periphery of the case 30 is turned over the outer edges of resistor 12 and backing washer 26 to effect a fixing. The capacitor 11 has a mica dielectric washer 11a which extends beyond the plates in similar manner to that described with reference to FIGURE 2. To avoid air gaps in the dielectric between the capacitor plates the washer may have its two faces coated with a silver deposit. A drawn ferrule 32, spun into position on the insulator 21, clamps a securing plate 31 coaxially into the end of the outer cover 30. A clamping plate 35 of mild steel is secured to the ferrule 32 by screws 36 so as to clamp, in the position shown, an insulating washer 33 and eyelet 34.

We have described the preferred forms of carrying out our invention, but it must be appreciated that various modifications may be made without exceeding the invention. For example it is possible to mount the resistor corresponding to h of FIGURE 1, outside and away from the coupling device. Also the connector 7 may be separate from, but joined with, the outer conductor of the end terminal of which 1 is the inner conductor. An analogous modification may be made in the connector 10.

I claim:

1. In a coupling device for a concentric cable, an inner conductor and an outer coaxial conductor together constituting a first end terminal and an inner conductor and an outer coaxial conductor together constituting a second end terminal, a disc type resistor coaxial with the end terminals and making electrical connection near its centre with the inner conductor of the first end terminal and making connection near its periphery with the outer conductor of said first end terminal, a first capacitor of plate form disposed with its main surface in a plane normal to the axis of said conductors, an electrical connection between the resistor and one plate of said first capacitor, an electrical connection between the other plate of said first capacitor and the inner conductor of the said second end terminal, means electrically connecting the outer conductors of the end terminals through a second capacitor, the second capacitor being of plate form whose main surface lies in a plane normal to the said axis.

2. A coupling device according to claim 1 wherein said means comprises a metallic sleeve integral with the outer conductor of the first end terminal and a metallic sleeve integral with the outer conductor of the second end terminal.

3. A device according to claim 1 wherein said means comprise metallic sleeves at least one of which is separate from but joined with the outer conductor of one end terminal.

4. A device according to claim 1 wherein said resistor is of the carbon disc type.

5. A device according to claim 1 comprising a second resistor of disc form disposed in a plane normal to the longitudinal axis of the device and serially connected between the outer conductors of said end terminals in shunt to said second capacitor.

6. In a coupling device for a concentric cable, an inner conductor and an outer coaxial conductor together constituting a first end terminal and an inner conductor and an outer coaxial conductor together constituting a second end terminal, a disc type resistor coaxial with the end terminals and making electrical connection near its centre with the inner conductor of the first end terminal and making connection near its periphery with the outer conductor of said first end terminal, a first capacitor of plate form disposed with its main surface in a plane normal to the axis of said conductors, an electrical connection between the resistor and one plate of said first capacitor, an electrical connection between the other plate of said first capacitor and the inner conductor of the said second end terminal, an annular metallic member extending from the outer conductor of the first end terminal, an annular metallic member extending from the outer conductor of the second end terminal, opposing faces of said annular members sandwiching a suitable dielectric to constitute a second capacitor whose plates lie in a plane normal to said axis.

7. A device according to claim 6 wherein one of said annular members is integral with the outer conductor of one end terminal and the other of said annular members is integral with the outer conductor of said other end terminal.

8. A device according to claim 6 wherein at least one of said annular members is separate from its respective outer conductor of the end terminal but is conductively joined thereto.

9. A device according to claim 6 comprising a second resistor of disc form disposed in a plane normal to the longitudinal axis of the device and serially connected between the outer conductors of said end terminals in shunt to said second capacitor.

10. In a coupling device for a concentric cable, a first inner conductor and a first outer conductor concentric with the first inner conductor, the said conductors together constituting a first end terminal and a second inner conductor and a second outer conductor concentric with said second inner conductor and together therewith constituting a second end terminal, a disc-type resistor in a plane normal to the axis about which said conductors are concentric, said resistor being electrically connected between the said conductors of the first terminal, a first capacitor of disc form lying in a plane normal to said axis, connecting means for electrically connecting said first capacitor serially between said resistor and the inner conductor of said second terminal, an insulating bush encircling said connecting means and a second capacitor encircling said bush and lying in a plane normal to said axis, and further connecting means for connecting the plates of said second capacitor serially between the outer conductors of the end terminals.

11. A device according to claim 10 comprising a second resistor of disc form and means for connecting said second resistor in shunt to said second capacitor.

12. A high frequency coupling device for a pair of coaxial cables, each cable having an inner conductor and an outer conductor, comprising a pair of planar capacitors, a planar resistor, means for connecting said planar resistor to one side of each of said planar capacitors, an assembly for mounting said planar capacitors and said planar resistor so that the plane of each is normal to the axis of said coaxial cables with said planar capacitors being substantially coplanar, metallic means for connecting the inner conductor of one of said cables to one side of one of said capacitors and the outer conductor of said one cable to said one side of the other of said capacitors, and metallic means for connecting the center conductor of the other of said cables to the other side of said one capacitor and for connecting the outer conductor of said other of said cables to the other side of said other capacitor.

References Cited in the file of this patent
UNITED STATES PATENTS

| | | |
|---|---|---|
| 2,451,201 | Clark | Oct. 12, 1948 |
| 2,620,396 | Johnson | Dec. 2, 1952 |